April 19, 1960

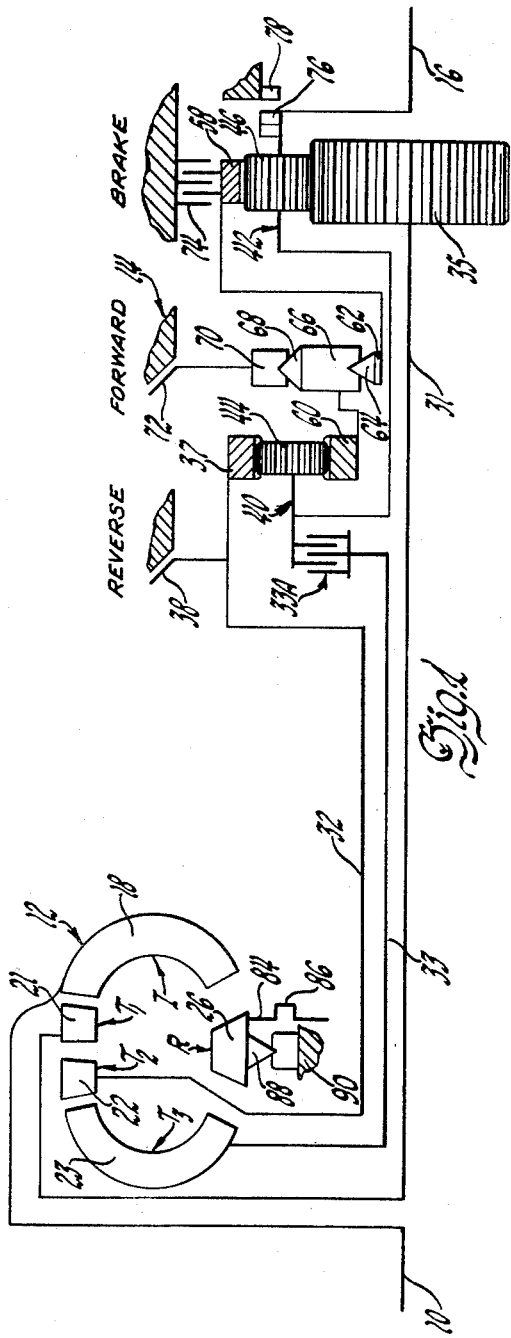

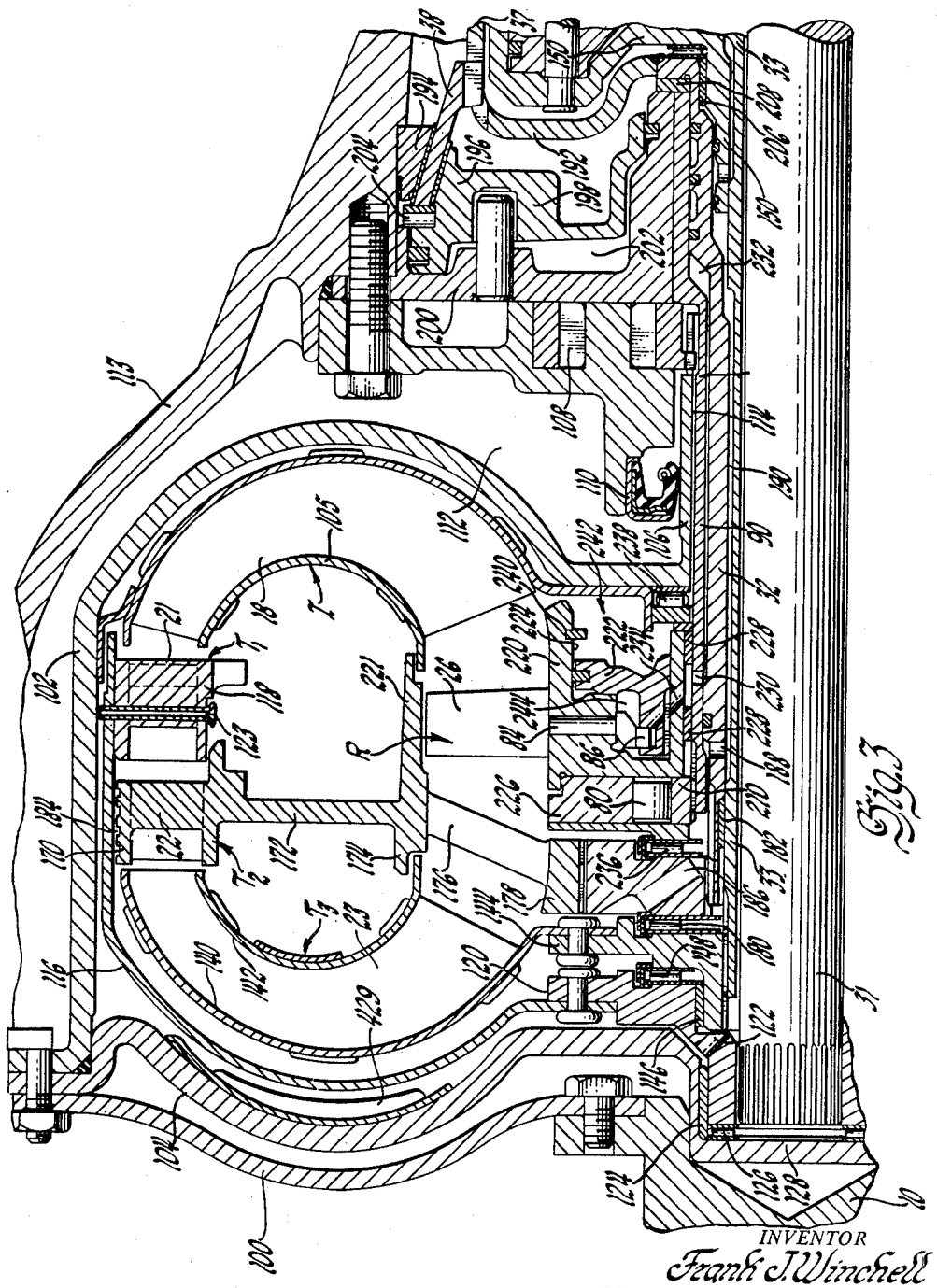

F. J. WINCHELL 2,932,989

TRANSMISSION

Original Filed July 25, 1956

INVENTOR
Frank J. Winchell
BY
T. R. Chisholm
ATTORNEY.

April 19, 1960 F. J. WINCHELL 2,932,989
TRANSMISSION
Original Filed July 25, 1956 4 Sheets-Sheet 4

INVENTOR
Frank J. Winchell
BY
T. L. Chisholm
ATTORNEY.

United States Patent Office 2,932,989
Patented Apr. 19, 1960

2,932,989

TRANSMISSION

Frank J. Winchell, Bloomfield Hills, Mich., assignor to General Motors Corporation, Detroit, Mich., a corporation of Delaware Original application July 25, 1956, Serial No. 600,022. Divided and this application September 16, 1957, Serial No. 684,345

2 Claims. (Cl. 74—759)

This is a division of application of S.N. 600,022 filed July 25, 1956.

This invention relates to improvements in the construction, arrangement, and control system in transmissions embodying hydrodynamic torque transmitting devices which drive gearing for driving a power output shaft at various speed ratios. The torque transmitting device may be a torque converter and the transmission may be used for driving a motor vehicle.

Hydrodynamic torque converters can be readily designed to provide any practical degree of torque multiplication on starting, but if the starting torque ratio is sufficiently high, the torque delivered by the turbine or output member may decrease too rapidly to be practical as the turbine starts to turn, and vanishes at an impractically low turbine speed. This provides poor acceleration of the vehicle and may provide too little torque as the device approaches coupling or one-to-one speed ratio. On the other hand, the turbine can be constructed to provide acceptable coupling characteristics when the load reaches approximately impeller speed, but this is done at a sacrifice of starting or stall torque and at the sacrifice of accelerating torque in the middle ranges of car speed.

The considerations have resulted in the design and construction of torque converters having various arrangements of several turbines of different torque characteristics, with or without torque multiplying gearing. While these have been satisfactory within their inherent limitations, they have had the disadvantage that they do not sustain adequate torque multiplication during intermediate speed ranges of the vehicle, which makes sluggish cars and makes it impractical, without changing gears, to obtain the so-called passing gear by which is meant a sudden increase of torque ratio at any car speed throughout a wide range of car speeds.

This invention seeks to overcome these and other disadvantages of known hydrodynamic transmissions and to provide a transmission which changes torque ratio smoothly and continuously, to improve the efficiency of torque converters by providing a torque converter which has a high starting ratio and maintains a higher torque ratio than was formerly possible during acceleration to one-to-one drive. The invention also seeks to provide improved and simplified means for increasing the torque ratio at any car speed.

Any torque converter turbine has the inherent characteristic of providing diminishing torque multiplication as the turbine speed increases toward impeller speed as long as there is no turbine ahead of the turbine in question in the liquid stream from the impeller, which other turbine is delivering torque thus influences the turbine under consideration. This invention combines a series of turbines, each of different torque characteristics, in such a way that as the torque multiplication or torque ratio of one turbine decreases, the torque multiplications of downstream turbines increase. If a sufficient number of such turbines is provided, then while the turbines of the series are successively fading out, that is their torque multiplications are decreasing toward zero, the downstream turbines are increasing their torque ratios. In this way the torque ratio of the torque converter as a whole decreases toward coupling much more slowly than heretofore and stays at practically high values over long periods of acceleration of the vehicle. This provides an easily maneuverable and responsive vehicle of high performance.

This invention also provides means for increasing the range of torque ratio of one or more of the turbines at any car speed to provide acceleration in emergencies or for a passing gear. This may be done, for example by changing the angle of reaction blades, if such are used.

The invention also includes improved arrangements of gearing especially helpful in achieving the foregoing objects, as well as improved control system including improved timing arrangements which assure the smooth application of friction devices which establish various combinations of gearing.

It is a specific object of the invention to improve the operation of gearing as shown in the application for U.S. Patent S.N. 600,022 filed July 25, 1956 by insuring the positive and reliable operation of certain over-running clutches by which various elements of the hydrodynamic torque converters are connected to the drive train.

The foregoing and other objects and advantages of the invention will be apparent from the annexed description and from the accompanying drawings, in which:

Fig. 1 is a schematic representation of one form of transmission embodying the invention, this being half of a symmetrical section along the axis;

Fig. 2 is a chart of the control conditions showing how the various drive conditions are established;

Figure 3A:
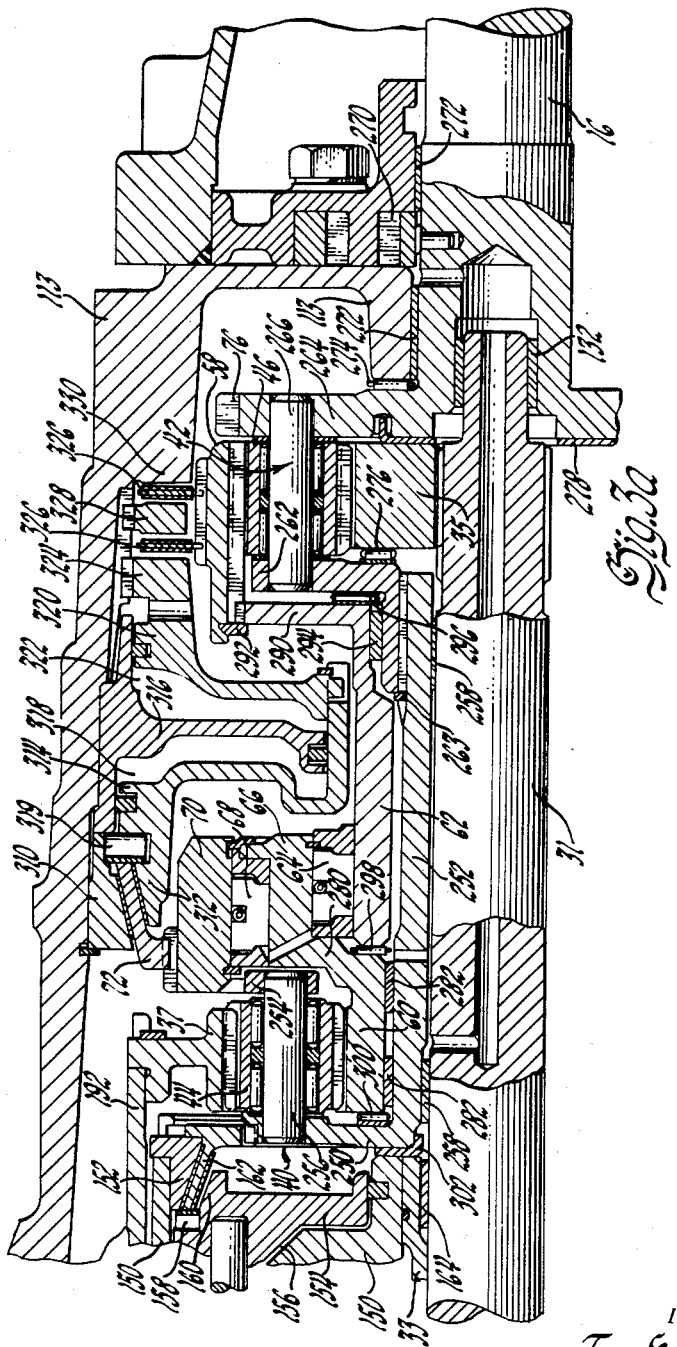
Figure 4:
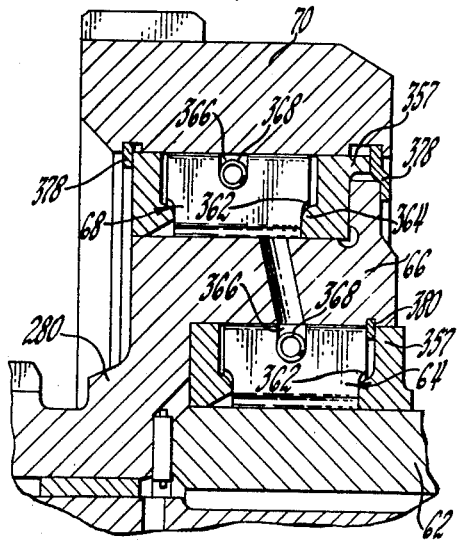
Figure 5:
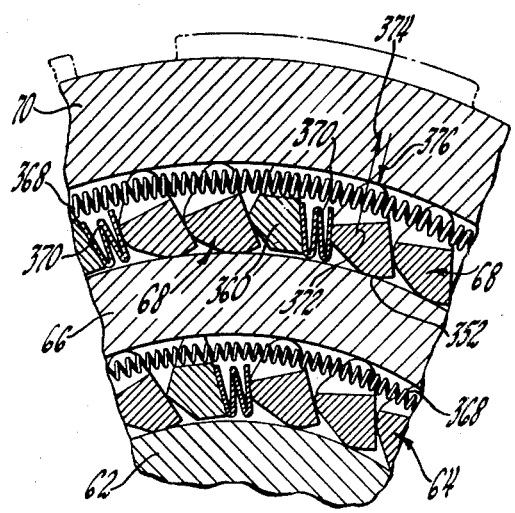
Figure 6:
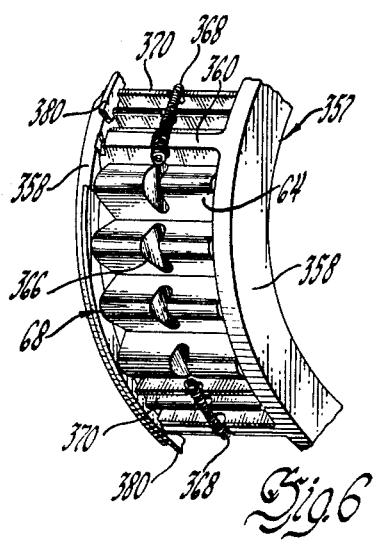

Figs. 3 and 3A together constitute one-half of a symmetrical, longitudinal section of the actual structure of a transmission embodying one form of the invention;

Fig. 4 is an enlarged section taken as Figure 3A is taken of a free-wheel device;

Fig. 5 is a section on the line 5—5 of Fig. 4;

Fig. 6 is a perspective of a portion of the free-wheel device; and

Figure 7:
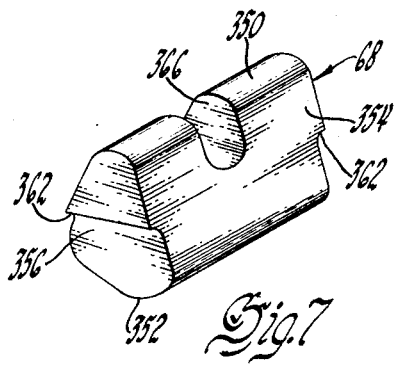

Fig. 7 is a perspective of a sprag or locking element of the free-wheel device.

Referring to Fig. 1, the transmission includes an input shaft 10 driving a hydrodynamic torque converter 12 which drives planetary forward and reverse reduction gearing 14 connected to a final output or drive shaft 16. The torque converter itself may be constructed and arranged as described below and includes a pump or impeller I of generally known form represented diagrammatically in Fig. 1 by a single blade 18 rotated by the input shaft 10 and circulating liquid in a closed toroidal path which includes a series of turbines, preferably three, and a reaction member or guide wheel. The first turbine $T_1$, represented by a single blade 21, the second turbine $T_2$, represented by a single blade 22, which receives oil from the first turbine $T_1$, and a third turbine $T_3$, represented by a single blade 23, which receives oil from the turbine $T_2$ and returns oil to the pump I, constitute the power output elements of the torque converter, and these are the driving or input elements for the planetary gearing. The reaction member R is represented by the single reaction blade 26.

The first turbine $T_1$ is connected by a central shaft 31 to a rear input sun gear 35 of the planetary gearing. The second turbine $T_2$ is connected through a hollow shaft 32 surrounding the shaft 31 to a front input ring gear 37 which, to establish reverse drive, can be held by a device 38 as will be explained. The turbine $T_3$ is connected through a hollow shaft 33 also surrounding the central shaft 31 and a neutral clutch 33A to drive the front carrier 40 and the rear carrier 42 of the planetary gearing, which carriers are connected together and respectively support front planetary pinions 44 meshing with the front input ring gear 37 and rear planetary pinions 46 meshing with the rear input sun gear 35. The shaft 33 and the carriers 40 and 42 form the principal drive shaft of the transmission and are connected to the transmission output shaft 16. A forward drive reaction ring gear 58 meshing with planets 46 completes the rear planetary unit of the reduction gear, and a reaction sun gear 60 meshing with the front planetary pinions 40 completes the front planetary unit.

The rear reaction gear 58 may be held fast to establish drive from the first turbine $T_1$ through the planetary reduction gear 35—46—58. To this end the reaction gear 58 is connected to the hub or inner race 62 of an inner one-way torque-establishing device having any suitable one-way or ratchet members mounted inside of an intermediate hub 66 which forms the outer race of the inner one-way device. This is symbolically represented by the blade 64 fixed to the inner race 62 and overlapping the outer race 66, which indicates that the race 62 can turn forward toward the eye of the observer and away from the race 66 but cannot turn in the opposite direction. This is a symbolic representation of any suitable one-way torque-establishing device. The intermediate hub 66 forms the inner race for an outer one-way torque-establishing device represented by the blade 68 fixed to the intermediate race 66 and overlapping an outer race 70 which can be held against rotation by a device 72 which provides forward drive whenever the neutral clutch 33A is engaged. The intermediate race 66 is connected to the front reaction sun gear 60 and may be formed integral with it. The arrangement of the one-way devices is such that when the forward device 72 is set, the hub 66 and the reaction sun gear 60 are prevented from turning backward and the hub 66, in turn, prevents the inner race 62 and the reaction gear 58 from turning backward. In one condition of operation, as will be explained, the ring gear 58 turns forward while the reaction sun gear is held stationary, and under another condition, both the ring gear and the sun gear rotate forward. In reverse drive sun gear 60 is positively driven backward by the ring gear 58 through the one-way device 62—64—66, forward device 72 being released, as will be explained.

Heretofore the various definitions of the terms clutch and brake have caused confusion. Some attempts to define the terms have been based on use or function regardless of structure while others have been based on type of structure or arrangement regardless of use or function. This has sometimes led to definitions of clutch and brake being mutually exclusive where they should not be and has led to overlapping definitions where mutual exclusion was intended. None of these definitions which have come to my attention have satisfactorily taken care of the situation in which an identical specimen is sometimes a brake and sometimes a clutch. Neither do they adequately describe a situation in which it is immaterial whether a member is a brake or a clutch, as described by reference to structure, where the significant consideration is the function of the device regardless of its structure.

To avoid this confusion and indefiniteness, the term torque-establishing device is used herein generically to mean any disengageable device which can be engaged to prevent rotation between two members which are otherwise relatively rotatable. If both members are rotatable absolutely, the device when engaged forces them to rotate at the same speed so that one member can drive the other. On the other hand, if one of the members is fixed, then engagement of the device holds the other member fast, in which case the generic device may be specifically defined as one form of brake or lock. Where the device prevents relative rotation between two members in one sense of rotation but permits relative rotation in the opposite sense, then the device may be sub-generically defined as a one-way device or ratchet device or freewheeler which terms are used to mean any device between two relatively rotatable members which permits the first member to rotate in one sense with respect to the second member but prevents the first member from rotating in the opposite sense with respect to the second member; that is, it locks the two members together. If both members are rotatable absolutely, the freewheeler is a one-way drive clutch. If one of the members cannot rotate, the freewheeler becomes a one-way brake.

These definitions are adapted in view of the custom of engineers of referring to a clutch as anything which engages to establish drive or change ratios, and referring to a brake as something which retards the vehicle.

Operation of general arrangement

For normal forward driving, the forward torque-establishing device 72 is set, the neutral clutch 33A is engaged, and all other torque-establishing devices are released, as shown in Fig. 2. On starting, the inertia of the car holds carriers 40, 42 and the turbine $T_3$ stationary. Oil from the pump I, rotated at suitable speed, exerts torque on $T_1$ to drive the rear input sun gear 35 forward, which because the reaction gear 58 is held by forward device 72 and the two one-way devices 70—68—66 and 66—64—62, drive the output shaft forward at reduced speed, multiplying the torque supplied by turbine $T_1$ by the ratio of the gearing 35—46—58. This necessarily also positively drives the turbine $T_3$ forward regardless of hydraulic conditions in the torque converter because $T_3$ is positively connected to the output shaft 16. In addition, oil flowing from $T_1$ to $T_2$ exerts torque on $T_2$, which through shaft 32 drives the front input ring gear 37 forward, tending to rotate the front pinions 44 forward. When ring gear 37 rotates fast enough this tends to rotate the front reaction sun gear 60 backward, but this is prevented by the outer one-way device 70—68—66 and, in fact, the front sun gear has previously been locked by the rear reaction gear 58 and the two one-way devices as described. Consequently, the front ring gear 37 adds to the drive the torque of $T_2$ multiplied by the ratio of the front planetary gear set 60—44—37.

On starting the car and below some definite speed, depending upon the design of the blades of the torque converter, the turbine $T_3$ may not exert any significant positive or forward torque derived from hydraulic action but, as previously stated, it is positively driven by the carriers. However, at some definite speed ratio of input shaft to output shaft, positive hydraulic torque is impressed on $T_3$ and its speed, due to hydraulic action, tends to exceed the speed of the carriers as driven by the other turbines. At this point $T_3$ assists in driving the car by torque exerted on the main drive shaft 33—33A—16.

As the speed of the car progressively increases from standstill, two things happen successively. First, the torque delivered to the output shaft by $T_1$ through the rear planetary units drops to a vanishing point as $T_1$ reaches its terminal speed. Meanwhile the speed of $T_2$ increases. When the speed of $T_2$ multiplied by the ratio of the front planetary unit, exceeds the speed of $T_1$ multiplied by the ratio of the rear planetary gearing, $T_2$ is driving the carriers faster than $T_1$ can drive them and the inner freewheeler 66—64—62 breaks away. Then the rear reaction gear 58 rotates forward and $T_1$ idles in the oil stream. $T_2$ is now driving the car and may be assisted by $T_3$. Second, upon further increase in the speed of the car, $T_2$ reaches its terminal speed and can no longer drive the carriers 40—42 through the front planetary as fast as $T_3$ can drive them, $T_3$ being directly connected to the carriers. $T_3$ alone then drives the carriers, the outer freewheeler 70—66—68 breaking away and the sun gear 60 turning forward while $T_2$ idles in the stream of oil.

For reverse drive, the neutral clutch 33A is engaged, the forward device 72 is released, and the reverse device 38 is set to hold the front ring gear 37 as a reaction gear, as shown in Fig. 2. Incidentally, this holds $T_2$ stationary during all reverse drive. Now, $T_1$ drives the rear input sun gear forward which, because carrier 42 is initially held stationary by the car, drives the ring gear 58 backward and, through the inner one-way device 66—64—62, drives the front sun gear backward. This is permitted, in fact, for although the outer one-way brake 70—68—66 tends to lock, its outer race 70 can turn backward, being unopposed by the released forward device 72. Consequently, the front sun gear 60 rotating backward drives the carrier 40 slowly backward, carrying the turbine blade $T_3$ positively backward. In fact, it is possible depending on blade design, for the turbine $T_3$ to have reverse torque impressed on it hydraulically, in which case it will assist in driving the car backward. The turbine $T_2$, being held stationary in reverse drive, acts as a guide wheel or reaction member directing oil from $T_1$ backward against the forwardly facing sides of the blades of $T_3$, causing them to drive the carriers backward.

In order to place the transmission in neutral, all of the torque-establishing devices are released, as shown in Fig. 2. Under these conditions $T_1$ can exert no torque on the output shaft 60 because the forward device 72 lets the planetary gears 46 spin the ring gear 58 idly. The turbine $T_2$ can exert no torque on the output shaft 16 because in driving the ring gear 37, the planetary gears 40 spin the reaction sun gear 60 freely backward since this gear is not held by the device 72. The third turbine $T_3$ can exert no torque because the neutral clutch 33A is not engaged.

It has been observed that when the car is set for drive, the turbines successively pick up the drive and thereafter exert torque at progressively decreasing ratios and that the car eventually becomes driven by the third turbine alone under conditions which are substantially hydraulic coupling, providing substantially one-to-one drive. If it is desired to drive the car at a low speed ratio indefinitely, the rear reaction gear 58 is positively held by a device 74 and all other torque-establishing devices are released, as shown in Fig. 2. In these conditions the first turbine $T_1$ drives the rear input sun gear 35 which, because the ring gear 58 is held, drives the carrier 42 and output shaft 16 forward at a speed which bears a constant ratio to the speed of the turbine $T_1$, this ratio being determined by the rear planetary gear set. The turbine $T_1$ cannot become disengaged from the drive because the reaction gear 58 is prevented from freewheeling. $T_2$ cannot have any effect on the drive because, altho it drives ring gear 37, there is nothing to hold the reaction gear 60, device 72 having been released. Consequently, under these conditions the car remains driven solely by $T_1$ in a definite range of speed ratios with respect to $T_1$.

This arrangement is also useful to retard the car going down grades. Device 74 is set and all other torque-establishing devices are released. $T_2$ and $T_3$ are effectively disconnected from the output shaft 16, as explained above, and the output shaft drives the carrier 42 whenever the car tends to drive the engine. This overdrives the turbine $T_1$; that is, it drives the turbine $T_1$ faster than the output shaft by the ratio of the planetary gear set 35—46—58 and at this high speed, the turbine $T_1$ tends to become an impeller, transmitting torque to the impeller blades 20 which are held to a slower speed by the engine and so oppose movement of the car.

The transmission may have any suitable parking lock or brake such as a gear or circular flange secured to the carrier 42 or output shaft 16 and having peripheral teeth 76 which can be locked by a dog 78 secured to the frame.

Structure

Figures 3 and 3A illustrate one form of actual structure embodying the invention including the elements and their mode of operation disclosed schematically above. Referring first to Fig. 3, the engine shaft 10 is bolted to a flywheel 100 which is bolted to a torque converter casing including an impeller shell 102 and a front cover 104. The blades 18 are attached to the impeller shell 102 and to an inner shroud 105. The space between the shell and the shroud forms the path through the impeller for working liquid, as is known. In the center of its rear end, the impeller shell 102 is welded to or formed integral with a tubular shaft 106 which drives any suitable oil pump 108 herein called the front pump. The shaft 106 is surrounded by any suitable seal 110 which prevents leakage of oil from the torque converter into the dry space 112 which encloses the torque converter and is enclosed by part of the transmission casing 113. The shaft 106 is spaced from the stationary reaction sleeve 99 to form a passage 114 by which oil may be supplied to the torque converter from the system as is known.

The first turbine $T_1$ includes an outer supporting shell 116 and an inner shroud 118 between which the blades 21 are fixed in any suitable manner. The $T_1$ shell 116 is riveted at its center to a flange 120 which may be keyed to the front end of the innermost shaft 31 which drives the sun gear 35, as shown in Fig. 1. The flange 120 may be provided with any suitable number of openings 122 for passage of oil for equalization of pressure between opposite sides of the $T_1$ shell 116. The $T_1$ assembly may be balanced by balancing pins 123 (for example three in number about the periphery) which may be positioned radially and held in any suitable manner. The front end of shaft 31 is supported by a radial bearing 124 and a thrust bearing 126 of any suitable form in a cap 128 formed in the front cover 104.

At its rear end, the first turbine shaft 31 is supported in a bearing sleeve 132 in a bore in the front end of the output shaft 16. The input sun gear 35, shown in Fig. 1, is keyed to the rear end of shaft 31 as shown in Fig. 3A.

The third turbine $T_3$ has an outer shell 140 and an inner shroud 142 between which the blades 23 are fixed. The outer shell is riveted to a flange 144 keyed to the shaft 33 which forms part of the main drive shaft of the transmission. At its front end the shaft 33 is supported by a radial bearing sleeve 146 and a thrust bearing 148, both of any suitable form and mounted in counterbores in the $T_1$ hub 120. While the thrust bearing 148 may be of any suitable form, it is preferably of the construction and arrangement disclosed in the application, S.N. 586,- 116 for U.S. patent filed by me on May 21, 1956, now U.S. Patent No. 2,854,300. At its rear end, as shown in Figs. 3 and 3A, the shaft 33 is keyed to one member of the neutral clutch 33A and its operating mechanism. This includes the clutch drum 150, keyed to the shaft 33, and having keyed to it a clutch cone 152 (Fig. 3A). The drum carries a sliding piston 154 forming with the drum an expansible chamber 156 to which oil under pressure can be admitted to urge the piston to the right, as Fig. 3A is seen, against the force of a waved return spring 158. A cone 160 is formed on the right-hand face of the piston, which cone with the previously mentioned cone 152 forms driving clutch elements between which the driven clutch cone 162 may be gripped when fluid under pressure is admitted to the cylinder 156. The clutch cone 162 is keyed to the front planetary carrier 40. When this clutch is engaged, the turbine $T_3$ is connected to the output shaft 16. The rear end of the shaft 33 may be supported on the shaft 31 by a bearing sleeve 164.

The second turbine $T_2$ includes an outer shell 170 and an inner shroud 172 between which the blades 22 are fixed in any suitable manner. The inner shroud 172 may be mounted on a hub 174 which is supported by a spider 176 on an inner hub 178 keyed to the front end of the $T_3$ shaft 32 and supported axially from the hub 144 by a thrust bearing 180 like bearing 148 supports in a counterbore in the hub 144. The spider may be constructed in any suitable manner, for example as shown in the application for U.S. patent of Kelley and Lindsay, S.N. 478,118 filed Dec. 28, 1954, or the application of Kelley Ser. No. 537,472 filed Sept. 29, 1955. The second turbine $T_2$ is supported radially by a radial bearing sleeve 182 between the front end of shaft 33 and the front end of shaft 32. The blades 22, outer shell 170, inner shroud 172, and hub 174 can be cast as a single integral structure if desired. The outer face of the shell 170 may be provided with grooves 184 to form a labyrinth seal with the $T_1$ shell 116. The hub 178 may have openings 186 or ducts formed through it, and the front end of the shaft 32 may have openings 188. These openings, with the space inside the hub 178, form a passage from the interior of the torque converter to the annular space 190 between the hollow shafts 32 and 33, which passage forms an outlet for oil from the torque converter, as will be explained.

As seen in Fig. 3 the rear end of the $T_2$ shaft 32 may be welded to a drum 192 to which is attached the front input gear 37 shown in Fig. 3A. To the drum 192 is also splined the conical drum 38, which corresponds to the device 38 in Fig. 1 and can move axially with respect to the drum 192 to be gripped between a stationary cone 194 and a non-rotatable cone 196 forming part of a piston 198 sliding in a stationary annular cylinder 200 fixed to the frame 113. The piston defines a pressure chamber 202 within the cylinder 200 to which oil under pressure may be admitted from the control system as will be explained to push the piston to the right as Fig. 3 is seen to engage three cones 196, 38, 194. The piston 198 may be urged to the left to disengage the cones by a waved spring 204. The rear end of the $T_2$ shaft 32 may be supported radially by a bearing sleeve 206 on the drum 150 and it may be supported axially between thrust bearings 208 bearing against the cylinder 200 and the drum 150, respectively.

Referring to Fig. 3A, the front carrier 40 includes a front flange 250 which may be integral with a carrier sleeve 252, a rear flange 254 and the connecting spindles 256 on which the planetary gears 44 are mounted. The neutral clutch drum 162 is keyed to the front flange 250. The sleeve 252 is supported for rotation on bearing sleeves 258 on shaft 31 and its rear end is keyed to a tubular extension on the front flange 262 of the rear planetary carrier 40. The flange is held against axial movement to the left by a snap ring 263. The carrier 42 is completed by the rear flange 264 and spindles 266 carrying the planet gears 46. The rear flange 264 may be formed integral with the output shaft 16 and is provided with the previously mentioned parking teeth 76 which may be engaged by any suitable parking lock or brake to prevent rotation of the output shaft 16.

Any suitable form of oil pump 270 is keyed to the output shaft 16 for providing oil under pressure in response to forward rotation of the car as is customary. The output shaft 16 is supported in the casing 113 by any suitable radial bearings 272 and thrust bearing 274.

The sun gear 35 may be supported axially between the flanges 262 and 264 by thrust bearings 276 and 278. Either or both of these may be like bearing 148.

The sun gear 60 is formed integral with a flange 280 formed integral with the intermediate race 66, this structure being supported for rotation on bearing sleeves 282 on carrier sleeve 252. The sprags 68 corresponding to the diagrammatic ratchet member 68 of Fig. 1 are supported between the intermediate race 66 and the outer race 70, to which is splined the conical drum 72, which is the forward device 72 of Fig. 1.

The inner race 62 of the inner free-wheel device 62—64—66 is formed as a sleeve integral with a flange 290 to which the ring gear 58 is keyed. The ring gear is held axially on the flange 290 by a snap ring 292. The sleeve 62 is mounted for rotation on a bearing sleeve 294 mounted on the tubular extension of the carrier flange 262, and is supported axially between a thrust bearing 296 which bears against the flange 262 and by a thrust bearing 298 which bears against the sun gear 60 which in turn is supported axially by a thrust gearing 300 bearing against the flange 250, the other side of which is supported axially by bearing 302 which bears against the neutral clutch drum 150 and the end of shaft 33.

The forward drive device drum 72 can be held between an outer stationary conical device 310 and an inner non-rotatable conical device 312 on a cylinder 314 slidable over a stationary piston 316 and forming with the piston a pressure chamber 318 to which fluid under pressure may be admitted from the control system to urge the device 312 to the left against the force of a restoring spring 319 to engage the cones 310—72—312 to hold the outer race 70 fast. The cylinder 314 extends to the right beyond the piston 316 and is sealed by an end 320 keyed to the cylinder and forming with the piston and cylinder a second pressure chamber 322 to which fluid may be admitted by the control system to urge the end and the cylinder to the right, as Fig. 3A is seen. The end 320 carries a stationary non-rotatable brake member 324 splined to the casing. Movement of the brake member 324 to the right engages a stack of friction members, namely the driven brake discs 326 splined to the ring gear 58, the non-rotatable brake member 328, and the shoulder 330 formed in the casing 113. This holds the ring gear 58 for hill braking.

In transmissions of the type disclosed herein there has been failure of one or both of the overrunning devices 62—64—66 and 66—68—70. In one well-known form of overrunning device the ratchet or one-way members are rollers such as 80 in Fig. 3, placed between an inner circular race and an outer race provided with sloping cam surfaces. Individual energizing springs urge the separate rollers toward the narrow ends of the spaces between the cams and the inner race so that if the inner race tends to rotate toward the narrow ends of the spaces, the rollers wedge the two races together and lock the clutch. If the inner race tends to rotate in the opposite sense, the friction between the inner race and the rollers tends to carry them toward the wide ends of the spaces and this permits the inner race to rotate freely with respect to the outer race. In another form of overrunning device the ratchet members are sprags such as are indicated at 64 and 68 in Fig. 3A. These are placed between two circular races and are urged into nearly radial position in contact with both races by some form of energizing spring, frequently a garter spring or a continuous coil spring that surrounds all of the sprags. The sprags form struts which, when properly positioned, transmit force from one of the races to the other when one race tends to rotate in one sense with respect to the other and so locks the races together. However, tendency to rotate in the other sense causes the sprags to swing out of locking position and let the races rotate freely with respect to each other.

With either of the above forms of overrunning device, if one race should be rotated while the outer race is not held, the force of the energizing springs holds the ratchet members in contact with both races causing sufficient friction to rotate both races together, regardless of the sense of rotation. When the speed of rotation becomes great enough, centrifugal force on the ratchet members will force them out of contact with the inner race against the opposing forces of the energizing springs. This force of the springs varies from one ratchet member to another in any particular clutch. Because the force varies, the ratchet members will move out of contact at different times but the free race may be rotated as long as any member remains in contact with both races.

Assume that the inner race is rotating in the direction or sense of rotation which tends to lock up the clutch when the outer race is held and that the outer race is free and that nearly all of the ratchet members have been thrown out of contact with the inner race by centrifugal force. Assume also that the outer race is now stopped, while the inner race continues to rotate. As the outer race slows down approaching the stop, the ratchet members will be moved into contact with the inner race by energizing springs, but because the force of the springs on the separate ratchet members varies, the ratchet members will move into contact with the inner race and tend to lock at different times. I believe that these successive attempts to lock by the ratchet members have caused various kinds of failures which have been noted in overrunning clutches in this form of gearing. One example is breaking of sprags. For example, consider the condition when the engine is idling fast, as in warming up while the car is standing and the neutral clutch 33A is disengaged. The carriers 42 and 40 are held stationary by the drive wheels. $T_1$ is driving sun gear 35 so that the ring gear 58 carrying the innermost race 62 is rotated backward, carrying with it race 66, to rotate the outermost race 70 backward. With particular overrunning devices which have been used, it has been found that rollers and sprags between races 66 and 70 will move out of contact at engine idling speeds of above 1400 r.p.m. which speed frequently occurs.

Assume that under these conditions the forward device 72 is engaged to put the transmission in forward drive. This rapidly slows down and stops the device drum 72 and simultaneously exerts considerable torque on the overrunning device 66—68—70. If such torque is exerted while only a few of the ratchet members are disengaged, trouble results. If rollers are used, the races may be distorted and forced out of concentricity. If sprags are used, the sprags may be broken or the races may be temporarily sprung out of concentricity or the sprags may turn over, slip or lock up so that they will not release.

It is one of the objects of this invention to overcome the difficulties just described by constructing the overrunning devices so that the ratchet members remain in contact with both races under all conditions which can occur in the operation of the transmission so that when either of the inner races is driving either of the outer races and torque is suddenly applied to the overrunning device by stopping the outer race, all of the ratchet members lock the same time, enforcing concentricity of the races and distributing the torque among all of the ratchet members substantially equally. One way of accomplishing this is shown in Figs. 4 to 7, inclusive.

The sprags 64 and 68 are identical, consequently only one will be described. Each sprag includes an outer cylindrical surface 350 which is not necessarily circular and which bears on the outer race 70, and an inner cylindrical surface 352 which may not be circular and which bears on the inner race 66. Each sprag has one flat face 354 and an opposite face having a ridge or projection 356. The sprags are assembled in a cage 357 which includes a pair of side cheeks 358 joined by a number of integral bars 360 spaced about the cheeks to leave windows, in which windows the sprags 68 are assembled. The bars 360 are of the same general cross section as that of the sprags 68. Each sprag is cut away at each end to form a shoulder 362 which is supported on a ledge 364 formed on the cheek of the cage. The sprags and bars are notched at the center as at 366 to receive a garter spring 368 which forms the energizing spring and urges the sprags into contact with both races 70 and 66. Preferably from two to four sprags are assembled in each window and all of the sprags are urged in one direction against the end of the window by an accordion spring 370 placed in each window. As shown in Fig. 5, the center of gravity of each sprag is at the point 372. The sprag acts as if its mass were concentrated at this point and when the device is rotated, tends to move it in the direction of the arrow 374. The point of contact between the sprag and the race 70 is at the point of the arrow 376, and the supporting force of the race 70 against rotation on the sprag acts at this point. Consequently, there is a moment due to rotation of the device as a whole which tends to rotate the sprag clockwise about the point of the arrow 376 and this constantly urges the surface 352 into contact with the race 66. Therefore, no matter how fast the races are rotated there is no forced tending to move the sprag 68 out of contact with the inner race.

The accordion springs 370 extend across the length of the sprag, as shown in Fig. 6, and resiliently urge all of the sprags toward the bars 360. The flat face of the first sprag contacts the ridge of the bar and the flat face of each sprag contacts the ridge of the preceding sprag, so that all of the sprags are resiliently held parallel to the axis against the bars 360. This prevents twisting of the sprags in operation and reduces likelihood of breakage.

The outer cage 357 may be held in the outer race by a pair of snap rings 378 and the inner cage 357 may be held against the flange 280 by snap ring 380.

I claim:

1. A power transmission comprising in combination a first planetary gearset including an input gear, a reaction gear, and planet gears mounted on a carrier connected to an output shaft; a second planetary gearset including an input gear, a reaction gear, and planet gears mounted on a second carrier connected to the first carrier, means for rotating the first input gear forward, means for rotating the second input gear forward, a rotatable ring member, means for at times holding the ring member against rotation, a second ring member located concentrically inside the first ring member, and connected to the second reaction gear, one-way torque-transmitting elements between the ring members, a third ring member located concentrically inside the second ring member, one-way torque-transmitting elements between the second and third ring members, and means for selectively holding the first ring member to prevent backward rotation of the reaction gears or releasing the first ring member for backward rotation, the transmission including means for positively holding said one-way torque-transmitting elements in contact with both ring members between which they are located in spite of revolution of said one-way members about the axis of the ring members.

2. A power transmission comprising in combination a first planetary gearset including a sun gear, a ring gear, and planet gears mounted on a carrier connected to an output shaft; a second planetary gearset including a ring gear, a sun gear, and planet gears mounted on a second carrier connected to the first carrier, means for rotating the first sun gear forward, means for rotating the second ring gear forward, a rotatable ring member, means for at times holding the ring member against rotation, a second ring member located concentrically inside of the first ring member and connected to the second sun gear, one-way torque-transmitting elements between the ring members, a third ring member located concentrically inside of the second ring member, one-way torque-transmitting elements between the second and third ring members, and means for selectively holding the first ring member to prevent backward rotation of the first ring gear and second sun gear or releasing the first ring member for backward rotation, the transmission including means for positively holding said one-way clutch elements in contact with both ring members between which they are located in spite of revolution of said one-way members about the axis of the ring members.

References Cited in the file of this patent

UNITED STATES PATENTS

| | | |
|---|---|---|
| 2,385,799 | Dodge | Oct. 2, 1945 |
| 2,546,378 | Winther | Mar. 27, 1951 |
| 2,645,137 | Roche | July 14, 1953 |